Patented Dec. 26, 1939

2,184,520

UNITED STATES PATENT OFFICE 2,184,520

RECOVERY OF LEAD

Robert B. Erickson, Philadelphia, Pa.

No Drawing. Application November 2, 1938,
Serial No. 238,357

3 Claims. (Cl. 75—77)

This invention relates to the recovery of lead. More specifically the invention is concerned with the recovery of metallic lead from waste sludge resulting from the manufacture of tetra-ethyl lead by processes which are now well known, such for instance as the process used by E. I. du Pont de Nemours & Co.

This type of sludge has been dangerous and difficult to handle, and heretofore it has not been economically practicable to recover metallic lead therefrom, chiefly because of special problems encountered in attempted recovery methods.

From the economic standpoint, the recovery of lead from this sludge must be such as to require little handling and low cost equipment and treatment materials. The blast furnace is eminently suited to meet these general requirements, but attempts to use a continuously operated blast furnace have heretofore proven unsatisfactory because of the freezing or solidifying of the slag, which freezing occurs shortly after initiation of operation in the furnace, so that molten lead recovered from fresh material charged at the top of the furnace would not pass downwardly through the slag layer. In consequence, frequent shutdowns of the furnace were necessary, and the furnace had to be dismantled and the slag chipped out, with great loss of time, materials and labor.

I have discovered that the reason why this rather unusual freezing of slag occurred was because of the presence in the sludge being treated of substantial quantities of sodium chloride. The sodium chloride has a lower melting point than the slag which would normally be formed in the blast furnace, and furthermore it combines with certain ingredients of the normal slag, thus robbing the slag of these ingredients and in consequence disturbing the balance and/or composition of the normal slag which is necessary to make it fluid at furnace temperature. The resultant deficiency of certain ingredients in the normal slag causes it to have such a composition as to make it sticky and pasty.

In consequence, two slag components are present, one a heavy and pasty portion and the other a very light portion, the latter being high in salt content. The light portion accumulates on top of the heavy slag and further insulates it and the underlying lead from the higher temperatures in the upper part of the furnace, finally causing a freeze-up of the whole furnace.

In addition to lead oxide, tetra-ethyl lead sludge may contain anywhere from about 5% to about 30% of sodium chloride, by weight. Furthermore, such sludges may initially contain certain poisonous ingredients which are detrimental to the health of workmen handling the material.

According to the present invention, preferably after initial treatment to remove the poisonous ingredients (which treatment forms no part of the present invention), the sludge is leached to remove sodium chloride. This may be done by stirring or raking the sludge in chunk form in any suitable leaching bath. I have found that water is entirely suitable for this purpose, and preferably the water is renewed from time to time, depending upon the initial content of sodium chloride and the extent to which it is desired to remove it.

I have found that for satisfactory operation in a blast furnace, the sodium chloride content should be lowered to a point below 2.5% of the sludge by weight, a value not above about .5% being preferred.

The leaching may, of course, be carried out to such an extent as to remove substantially all of the sodium chloride, and while this is not always essential in overcoming the freezing of the slag, it is very important to remove practically all of the sodium chloride in instances where it is desired to mix the sludge with a sulphur bearing material. In lead recovery processes, various of the materials from which lead is being recovered frequently include materials containing a sulphide or a sulphate of a heavy metal. The reason why it is desirable to remove practically all of the sodium chloride in instances where the materials being treated include sulphur, is that any sodium chloride remaining will combine with the sulphur in the charge and by reaction will form lead chloride which is evaporated at the temperature of the furnace, thus causing a loss in the amount of lead recovered.

After leaching, the sludge is charged, together with coke or some equivalent heating and reducing agent or agents, into the top of a blast furnace. In accordance with common blast furnace practice, the metallic lead accumulates in the pot at the bottom of the furnace from which it is withdrawn by means of an upturned overflow outlet, the slag being withdrawn from time to time through the slag tap hole.

The sludge may also be mixed with other materials for recovery purposes, such as any lead oxide or oxide ore.

By following the foregoing process, withdrawal of the slag in molten form may be effected at any desired intervals without interrupting the continuous operation of the furnace, for the reason that the slag (as a result of the reduction in sodium chloride content) does not solidify at the temperatures used.

I claim:

1. A method for recovery of metallic lead from waste sludge resulting from the manufacture of tetra-ethyl lead, which sludge contains lead oxide and sodium chloride, which method includes leaching the sludge to reduce the sodium chloride content to a point below about 2.5% of the sludge by weight, charging the treated sludge, together with coke, into a continuously operated blast furnace wherein molten metallic lead accumulates in the furnace pot with a zone of molten slag thereabove, tapping the slag from said zone, and withdrawing the reduced molten lead substantially from the bottom of the pot.

2. A method in accordance with claim 1 in which the sodium chloride content of the sludge is reduced to a point below about .5% of the sludge by weight.

3. A method for recovery of metallic lead from lead bearing materials one of which comprises a waste sludge resulting from the manufacture of tetra-ethyl lead and contains lead oxide and sodium chloride, and another of which contains sulphur, which method includes leaching the sludge to remove substantially all of the sodium chloride, charging the sludge and the sulphur bearing material, together with coke, into a continuously operated blast furnace wherein molten metallic lead accumulates in the furnace pot with a zone of molten slag thereabove, tapping the slag from said zone, and withdrawing the reduced molten lead substantially from the bottom of the pot.

ROBERT B. ERICKSON.